United States Patent [19]

Piana et al.

[11] Patent Number: 5,373,068
[45] Date of Patent: Dec. 13, 1994

[54] USE OF ISOPHORONEDIAMINE ISOMER MIXTURES IN POLYADDITION RESINS

[75] Inventors: Hermann Piana, Alzenau; Klaus Huthmacher, Gelnhausen, both of Germany

[73] Assignee: Degussa Aktiengesellschaft, Frankfurt am Main, Germany

[21] Appl. No.: 124,656

[22] Filed: Sep. 9, 1993

Related U.S. Application Data

[62] Division of Ser. No. 31,328, Mar. 15, 1993, abandoned.

[30] Foreign Application Priority Data

Apr. 6, 1992 [DE] Germany .................... 4211454

[51] Int. Cl.$^5$ ............... C08G 59/50; C08L 63/00; C08L 63/06; C08F 283/10
[52] U.S. Cl. .................... 525/403; 525/113; 525/406; 525/523; 528/122; 528/250; 528/297; 528/407; 528/418; 528/421
[58] Field of Search ............ 525/113, 403, 523, 406; 528/122, 250, 297, 407, 418, 421

[56] References Cited

U.S. PATENT DOCUMENTS

| | | |
|---|---|---|
| 3,367,911 | 2/1968 | Daum et al. .............. 528/122 |
| 3,491,059 | 1/1970 | Grunsteidl .............. 528/122 |
| 3,629,181 | 12/1971 | Heer et al. .............. 528/122 |
| 5,166,396 | 11/1992 | Hutchmacher et al. ...... 558/431 |
| 5,166,444 | 11/1992 | Hutchmacher et al. ...... 564/491 |
| 5,264,501 | 11/1993 | Lucas et al. .............. 528/122 |
| 5,288,424 | 2/1994 | Lucas et al. .............. 528/122 |

FOREIGN PATENT DOCUMENTS

| | | |
|---|---|---|
| 0482347 | 4/1992 | European Pat. Off. . |
| 2541558 | 4/1976 | Germany . |
| 3137898 | 4/1983 | Germany . |
| 1515473 | 3/1977 | United Kingdom . |

OTHER PUBLICATIONS

Hatada, K., et al., J. Polymer Science (1987), vol. 25, pp. 477–480.
*Organische Chemie*, 1980, pp. 746–749, Streitwieser, Jr. et al., Verlag Chemie, Weinheim.
Heyde, W., et al., Die Angewandte Makromolekulare Chemie (1987), vol. 153, pp. 1–13, Aug. 1987.
Ullmann's Encyclopedia of Industrial Chemistry, 5th Edition (1987), pp. 547–563.
Ullmann's Enzyklopädieder Technischen Chemie, 4. Auflage, Band 19, pp. 301–317, 1980.
Scheulde, F., "Diamines of Isophorone chemistry, and their use in the curing of epoxy resins", Paintindia, May 1987, pp. 25–28.

*Primary Examiner*—Morton Foelak
*Assistant Examiner*—Rabon Sergent
*Attorney, Agent, or Firm*—Beveridge, DeGrandi, Weilacher & Young

[57] ABSTRACT

Use of isophoronediamine isomer mixtures containing more than 40%, preferably more than 50 up to 70%, of the trans-isomer and less than 60%, preferably less than 50 down to 30%, of the cis-isomer as reactant in polyaddition resins selected from epoxy, polyurethane and polyurea resins. As curing agents in epoxy resins compared with previously known isomer mixtures, the isomer mixtures containing more than 40% of the trans-isomer and less than 60% of the cis-isomer unexpectedly lead to an extended pot life with simultaneously reduced maximum curing temperature and therefore reduced shrinkage problems. The isomer mixtures are also surprisingly suitable as amine components with reduced reactivity for the chain extension of polyurethane/polyureas.

15 Claims, No Drawings

USE OF ISOPHORONEDIAMINE ISOMER MIXTURES IN POLYADDITION RESINS

This application is a division of application Ser. No. 08/031,328, filed Mar. 15, 1993, abandoned, which application is entirely incorporated herein by reference.

BACKGROUND AND INTRODUCTION

The present invention relates to the use of isophoronediamine isomer mixtures as a reactant in polyaddition resins selected from the epoxy resins and polyurethane/polyurea resins.

Isophoronediamine (IPDA) is 1-amino-3-aminomethyl-3,5,5-trimethylcyclohexane, which in the commercially available product is a mixture of isomers. For the isomer present in about 75% of the mixture, a chair conformation with a cis arrangement of the equatorial amino group on the $C_1$ atom and of the equatorial aminomethyl group on the $C_3$ atom has been established; the isomer present in about 25% of the mixture is the trans isomer with equatorial amino and axial methylamino group (Die Angewandte Makromolekulare Chemie 153 (1987) 1–13). Both the commercially available isophoronediamine and the isophorone diisocyanate (IPDI) obtainable therefrom with unchanged isomer ratio are used in the epoxy resin sector and the polyurethane resin art.

Epoxy resins are prepolymers that contain two or more epoxide groups per molecule; the reaction of these resins with a series of curing agents leads to cross-linked polymers. Ullmann's Encyclopedia of Industrial Chemistry, 5th Edition (1987), pages 547–563, provides a survey of the resins and curing agents as well as their use and the properties of the cured resins. According to the properties required for particular fields of application, epoxy resin formulations contain, apart from resin containing one or more epoxide groups and one or more curing agents, solvents, reactive diluents, plasticizers, fillers and inductors.

It is known for the curing of epoxy resins (for example those based on bisphenol A diglycidyl ether) to use, apart from numerous other aminic curing agents, also cyclo-aliphatic diamines, including commercially available isophoronediamine (IPDA). Reference is made for example to DE-OS 31 37 898 and GB 1,515,473 which are directed to epoxy resin compositions for the embedding of electrical components or for coating purposes, wherein commercially available isophoronediamine is also used as a curing component.

To obtain optimal properties of cured epoxy resins, it is usually important to achieve as high a degree of cure as possible. To reach this target, in the use of commercially available isophoronediamine according to Paintindia, May 1987, pages 25–28, two kinds of inductors are suitably used: namely those for influencing the processing time (pot life) and those for influencing the cross-linking density.

After stirring together an epoxy resin with an amine curing agent, epoxy resin systems are reactive and have a limited processing time. This is often a disadvantage if the amount charged cannot be processed in the time available. There was therefore a need for a cycloaliphatic amine curing agent that combines the advantages of the commercially available isophoronediamine having the isomer composition previously described at the start with a prolonged processing time. In addition to the extension of the pot life with maintenance of a good curing and stability of the epoxy resins, there was also an interest in lowering as far as possible the maximum temperature during curing since this is accompanied by a reduction of the shrinkage.

It is further known to react diisocyanates or prepolymers containing isocyanate groups, which in addition to urethane groups can also have urea, biuret, isocyanurate, carbonamide or carbodiimide structural elements, in a polyaddition reaction with diamines, including also commercially available isophoronediamine (Ullmann's Enzyklopädie der Technischen Chemie, 4. Auflage, Band 19, 301–317, in particular pages 302, 306, 308–310). As a result of the use of the diamines as the reactant in the systems mentioned, urea groups are introduced into the macromolecule. This is a so-called amine-chain extension wherein polyurethane ureas are formed.

As a result of the high reactivity of amino groups towards NCO groups, sterically hindered amines or diamines with electron-attracting substituents are frequently preferred for chain extension. A requirement therefore exists for extending the range of diamines with reduced reactivity as reactants for the synthesis of polyurethanes/-ureas by polyaddition in order to remove the problems caused by the high reactivity of known amines, such as inhomogeneities due to a too short pot life and a reduced selectivity in the reaction.

SUMMARY OF THE INVENTION

It has now been found that the prior art problems can be solved by using as the reactant in polyaddition resins (selected from epoxy resins and polyurethane/polyurea resins) an isophoronediamine isomer mixture that consists of more than 40% of the trans isomer and less than 60% of the cis isomer.

Preferably those isomer mixtures used consist of more than 50% of the trans and less than 50% of the cis isomer, in particular of more than 50 up to 70% of the trans isomer and less than 50 down to 30% of the cis isomer.

DETAILED DESCRIPTION OF THE INVENTION

The isophoronediamine isomer mixtures to be used according to the present invention can be obtained from commercially available isophoronediamine (with about 75% of the cis- and about 25% of the trans-isomer) by means of fractionation methods known to those skilled in the art since the cis-isomer boils higher than the trans-isomer. Unfavorable features of this prior art process, however, are the not inconsiderable technical effort required and the high amount of the cis-isomer that is obtained.

In contrast, by means of the present invention, isophoronediamine with the isomer distribution of more than 50 up to 70% of the trans and less than 50 down to 30% of the cis isomer can be simply prepared by a process according to the following equation:

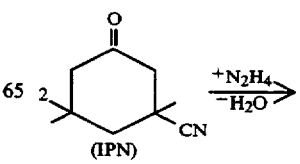

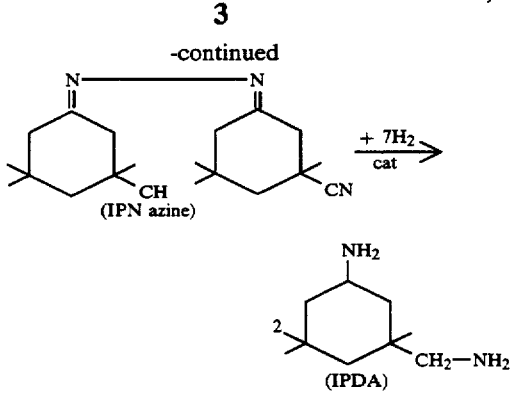

Isophorone nitrile is reacted with a source of hydrazine in the molar ratio of isophorene nitrile: hydrazine of 2 to 1 in presence of a solvent to form isophorone nitrile azine; isophorone azine is hydrogenated by hydrogen in one step to the diamine of the isomer composition mentioned in the presence of a solvent, such as water or alcohols, as the result of hydrogenative cleavage of the azine in the presence of ammonia and a catalyst. The catalyst is chosen from among (a) nickel-containing supported catalysts, (b) noble metal catalysts, and (c) Raney nickel or Raney cobalt catalysts in the presence of cocatalysts selected from among ammonium salts of mineral acids or carboxylic acids or of salts of Ni, Co, Al, Y, La, Ce, Ru, Rh, Pd, Ir, Pt.

U.S. Pat. Nos. 5,166,396 and 5,166,444 are incorporated by reference in there entirety.

The isophoronediamine isomer mixture to be used according to the present invention can be used as the sole curing agent component or mixed with other known amine- or amide-based curing agents for the curing of epoxy resins of differing chemical structure and differing molecular weight. Low-, medium and high-molecular epoxy resins based on glycidyl ethers of bisphenol A as well as other polyhydric phenols and phenolaldehyde adducts, and furthermore on glycidyl ethers of heterocyclic amides and imides, such as e.g. triglycidyl isocyanurate, aliphatic and cycloaliphatic diols and polyols as well as aromatic amines and epoxy resins based on glycidyl esters and epoxidized cycloaliphatic olefins, can be cured by use of the IPDA isomer mixture according to the present invention. The amine is used in the manner known in the art in an amount equivalent to the epoxide content of the resin.

As is generally known, the epoxy resin formulations to be cured frequently also contain additives chosen from among plasticizers (e.g., dialkyl phthalates and phosphoric acid esters), furthermore accelerators for obtaining a sufficiently complete cure, solvents including reactive diluents (e.g., of the type of monoglycidyl ethers or other monoepoxides), dyestuffs, pigments and fillers. With regard to the individual substances, reference is made to the documents mentioned above (e.g., GB 1,515,473) by way of example.

Epoxy resin formulations which contain, instead of commercially available isophoronediamine (IPDA) with about 75% of the cis isomer, an IPDA isomer mixture according to the present invention (with a content of more than 40% and preferably more than 50 up to 70% of the trans isomer) have been found surprisingly to have a prolonged pot life. A prolonged pot life for the epoxy resin - amine mixture is particularly desirable when using accelerators to obtain a sufficiently thorough cure, which results in reduced pot life. Reduced pot life leads to problems with the handling and processing safety. In such cases the use of the isomer mixture according to the present invention surprisingly constitutes a genuine solution to the problems that faced the art.

It is further unexpected that the invention also accomplishes a considerable lowering of the maximum curing temperature. This temperature lowering, which is desirable with regard to a reduced shrinkage, does not lead to a less thorough cure. Rather, the mechanical properties and the adhesive strength of the epoxy resins cured with the commercially available IPDA mixture or with that according to the invention are to a great extent the same.

The isophoronediamine isomer mixture according to the present invention can also be used successfully as an amine component for chain extension in polyurethanes or polyureas. It is assumed that the steric hindrance of the axially configured aminomethyl group at the $C_3$ atom leads to this reduction of the reactivity.

EXAMPLES

In the following examples and comparative examples, an epoxy resin based on bisphenol A diglycidyl ether (epoxy number 5.30 equivalents/kg, viscosity at 25° C. 10,400 mPa.s) and isophoronediamine - isomer mixture according to the invention (with 59% trans and 41% cis isomer or commercially available isomer mixture with 24% trans and 76% cis isomer) were mixed at 23° C. or 40° C. and 50% relative atmospheric humidity and the mixture degassed for 5 minutes at 20 hPa. The mixture of Example 1 and 1 CE (Comparative Example) contained no other additives. The mixture of Examples 2 and 2 CE, for the purpose of more thorough curing, additionally contained benzyl alcohol wherein the IPDA was initially dissolved. The mixture of Examples 3 and 3 CE, in addition to benzyl alcohol, also contained salicylic acid, in which case a solution was initially prepared from IPDA, benzyl alcohol and salicylic acid. The amounts used and the results of the determination of serviceable period (pot life), the temperature rise during the cure as a function of the batch size, and the lacquer testing are presented in Tables 1 to 3.

In Table 2, the serviceable period was determined by a Gelnorm ® gel timer of the Bachofer company following DIN 16945. The temperature rise was determined at 50% relative humidity in a PE beaker having a certain temperature with components preheated to the indicated temperature.

As shown in Table 1, the epoxy resin based on bisphenol A diglycidyl ether and isophoronediamine - isomer mixture according to the invention (with 59% trans and 41% cis isomer) results in an increase in the serviceable period (pot life) in comparison to the epoxy resin based on bisphenol A diglycidyl ether and commercially available isophoronediamine - isomer mixture (with 24% trans and 76% cis isomer).

As shown in Table 2, the epoxy resin based on bisphenol A diglycidyl ether and isophoronediamine - isomer mixture according to the invention (with 59% trans and 41% cis isomer) results in a lower maximum temperature during curing in comparison to the epoxy resin based on bisphenol A diglycidyl ether and commercially available isophoronediamine - isomer mixture (with 24% trans and 76% cis isomer).

As shown in Table 3, the lacquer properties of the cured epoxy resin in the case of use of isophoronediamine - isomer mixture according to the invention (with 59% trans and 41% cis isomer) can be obtained under conditions similar to that for commercial isophoronediamines, the increase of pot time and reduction of the maximum temperature is obtained without adversely impacting lacquer properties.

The test samples in Table 4 were prepared by casting the epoxy resins of example 3 and comparative example 3 in a mold (300×200×4 mm). The resins were heat cured for two hours at 120° C. Solvent resistance was detected on 50×50×4 mm resin plates according to DIN (German Industrial Standard) 53 495. Tensile properties were obtained according to DIN 53 455 and 53 457. The results of Table 4 show that the epoxy resin based on bisphenol A diglycidyl ether and isophoronediame-isomer mixture according to the present invention (with 59% trans and 41% cis isomer) results in increasing acid resistance and modulus, while tensile strength and elongation of this resin are not affected significantly in comparison to the epoxy resin based on bisphenol A diglycidyl ether and commercially available isophoronediamine-isomer mixture (with 24% trans and 76% cis isomer).

TABLE 1

| Example number | 1 | 1 CE | 2 | 2 CE | 3 | 3 CE |
|---|---|---|---|---|---|---|
| Amounts used (parts by weight) | | | | | | |
| Epoxy resin (5.3 eq./kg) | 84.0 | 84.0 | 116.3 | 116.3 | 112.3 | 112.3 |
| IPDA (59% trans/ 41% cis) | 20.0 | | 26.1 | | 25.0 | |
| IPDA (76% cis/ 24% trans) | | 20.0 | | 26.1 | | 25.0 |
| Benzyl alcohol | | | 23.9 | 23.9 | 22.0 | 22.0 |
| Salicyl alcohol | | | | | 3.0 | 3.0 |
| Serviceable period (min.) | | | | | | |
| 10 g/23° C. | 245 | 240 | | | 78 | 75 |
| 10 g/40° C. | | | 60 | 57 | | |

TABLE 2

| Example number | 1 | 1 CE | 2 | 2 CE | 3 | 3 CE |
|---|---|---|---|---|---|---|
| Temperature rise 20 g batch | | | | | | |
| Max. temp. (°C.) | 24 | 28 | | | 68 | 78 |
| Time to max. temp. (min.) | 150 | 150 | | | 45 | 43 |
| Temperature rise 200 g batch | | | | | | |
| Max. temp. (°C.) | | | 196 | 198 | 170 | 192 |
| Time to max. temp. (min.) | | | 49 | 46 | 33 | 29 |
| Viscosity rise in 15 min. (mPa · s) (initial viscosity 300 mPa · s) | | | | | 11.000 | 17.000 |

TABLE 3

The testing with regard to paint technology was carried out with bonderized sheets (Chemetall no. 129611 with bonderizing rust protection 26/NL60) at a dry film thickness of 45 ± 5 μm.

| Test | 3 | 3 CE |
|---|---|---|
| Curing | | |
| (min) | 30 | 30 |
| (°C.) | 120 | 120 |
| Glass temperature T$_g$ (°C.) (differential calorimetry) | 82 | 83 |
| Pendulum hardener (s) according to König (DIN 53157) | 213 | 209 |
| Cross cut test (DIN 53151) | 3–4 B | 3–4 B |
| Cupping test (mm) | 4 | 4 |

TABLE 3-continued

The testing with regard to paint technology was carried out with bonderized sheets (Chemetall no. 129611 with bonderizing rust protection 26/NL60) at a dry film thickness of 45 ± 5 μm.

| Test | 3 | 3 CE |
|---|---|---|
| (DIN 1520) Impact resistance | | |
| (cm) | b 15 | b 10 |
| (DIN 30670) | f 90 | f 90 | b = back
f = front

TABLE 4

| Example number | 3 | 3 CE |
|---|---|---|
| Solvent resistance (% weight gain after 8 weeks in . . .) | | |
| Water | 1.6 | 1.6 |
| 10% ethanol | 1.6 | 1.6 |
| 10% HCl | 1.6 | 1.9 |
| 10% NaOH | 0.1 | 0.1 |
| Tensile properties | | |
| Tensile strength (N/mm$^2$) | 62.4 | 62.4 |
| Elongation (%) | 3.9 | 3.9 |
| E-modul (N/mm$^2$) | 2160 | 1550 |

The present invention also concerns an epoxy resin composition containing an epoxy resin and an isophoronediamine isomer mixture containing more than 40% of the trans-isomer and less than 60% of the cis isomer. A two package kit can separately contain (a) an epoxy resin and (b) an isophoronediamine isomer mixture containing more than 40% of the trans-isomer and less than 60% of the cis isomer. A paint composition can contain pigment, an epoxy resin and an isophoronediamine isomer mixture containing more than 40% of the trans-isomer and less than 60% of the cis isomer. An article can be coated by depositing on a surface an epoxy resin and an isophoronediamine isomer mixture containing more than 40% of the trans-isomer and less than 60% of the cis isomer.

The present invention further concerns a polyurethane or polyurea composition containing (a) polyurethane or polyurea and (b) an isophoronediamine isomer mixture containing more than 40% of the trans-isomer and less than 60% of the cis isomer. An article can be coated by depositing on a surface polyurethane (or polyurea) and an isophoronediamine isomer mixture containing more than 40% of the trans-isomer and less than 60% of the cis isomer.

Further variations and modifications of the invention will become apparent to those skilled in the art from the foregoing and are intended to be encompassed by the claims appended hereto.

German Priority Application P 42 11 454.3, filed on Apr. 6, 1992, is relied on and incorporated by reference.

What is claimed:

1. A method for the curing of epoxy resins comprising reacting an epoxy resin with a curing agent comprising an isophoronediamine isomer mixture containing more than 40% of the trans-isomer and less than 60% of the cis isomer, wherein said curing agent is present in an amount sufficient to cure said resin.

2. The method according to claim 1, wherein said epoxy resin is an epoxy resin based on a glycidyl ether of a member selected from the group consisting of bisphenol A, polyhydric phenols, phenol-aldehyde adducts, and aliphatic and cycloaliphatic diols and polyols, or said epoxy resin is an epoxy resin based on glycidyl esters or epoxidized cycloaliphatic olefins.

3. The method according to claim 1, wherein said epoxy resin is an epoxy resin based on triglycidyl isocyanurate.

4. The method according to claim 1, wherein said curing agent is present in an amount equivalent to the epoxide content of said resin.

5. The method according to claim 1, wherein said isophoronediamine isomer mixture is present in an amount equivalent to the epoxide content of said resin.

6. The method according to claim 1, wherein said isophoronediamine isomer mixture contains more than 50% of the trans and less than 50% of the cis isomer.

7. The method according to claim 1, wherein said isophoronediamine isomer mixture contains more than 50 up to 70% of the trans isomer and less than 50 down to 30% of the cis isomer.

8. An epoxy resin composition comprising (a) an epoxy resin and (b) a curing agent comprising an isophoronediamine isomer mixture containing more than 40% of the trans-isomer and less than 60% of the cis isomer, wherein said curing agent is present in an amount sufficient to cure said resin.

9. The epoxy resin according to claim 8, wherein said curing agent is present in an amount equivalent to the epoxide content of said resin.

10. A two package kit comprising separately (a) an epoxy resin and (b) a curing agent comprising an isophoronediamine isomer mixture containing more than 40% of the trans-isomer and less than 60% of the cis isomer, wherein said curing agent is present in an amount sufficient to cure said resin.

11. The two package kit according to claim 10, wherein said curing agent is present in an amount equivalent to the epoxide content of said resin.

12. A paint composition comprising (a) pigment, (b) an epoxy resin and (c) a curing agent comprising an isophoronediamine isomer mixture containing more than 40% of the trans-isomer and less than 60% of the cis isomer, wherein said curing agent is present in an amount sufficient to cure said resin.

13. The paint composition according to claim 12, wherein said curing agent is present in an amount equivalent to the epoxide content of said resin.

14. A coated article comprising a surface having deposited thereon a mixture of an epoxy resin and a curing agent comprising an isophoronediamine isomer mixture containing more than 40% of the trans-isomer and less than 60% of the cis isomer, wherein said curing agent is present in an amount sufficient to cure said resin.

15. The coated article according to claim 14, wherein said curing agent is present in an amount equivalent to the epoxide content of said resin.

* * * * *